D. DOMENICO.
WINDMILL.
APPLICATION FILED NOV. 20, 1919.

1,361,696.

Patented Dec. 7, 1920.
5 SHEETS—SHEET 2.

INVENTOR.
Duani Domenico
BY Acker & Totten
ATTORNEYS.

D. DOMENICO.
WINDMILL.
APPLICATION FILED NOV. 20, 1919.
1,361,696.
Patented Dec. 7, 1920.
5 SHEETS—SHEET 3.
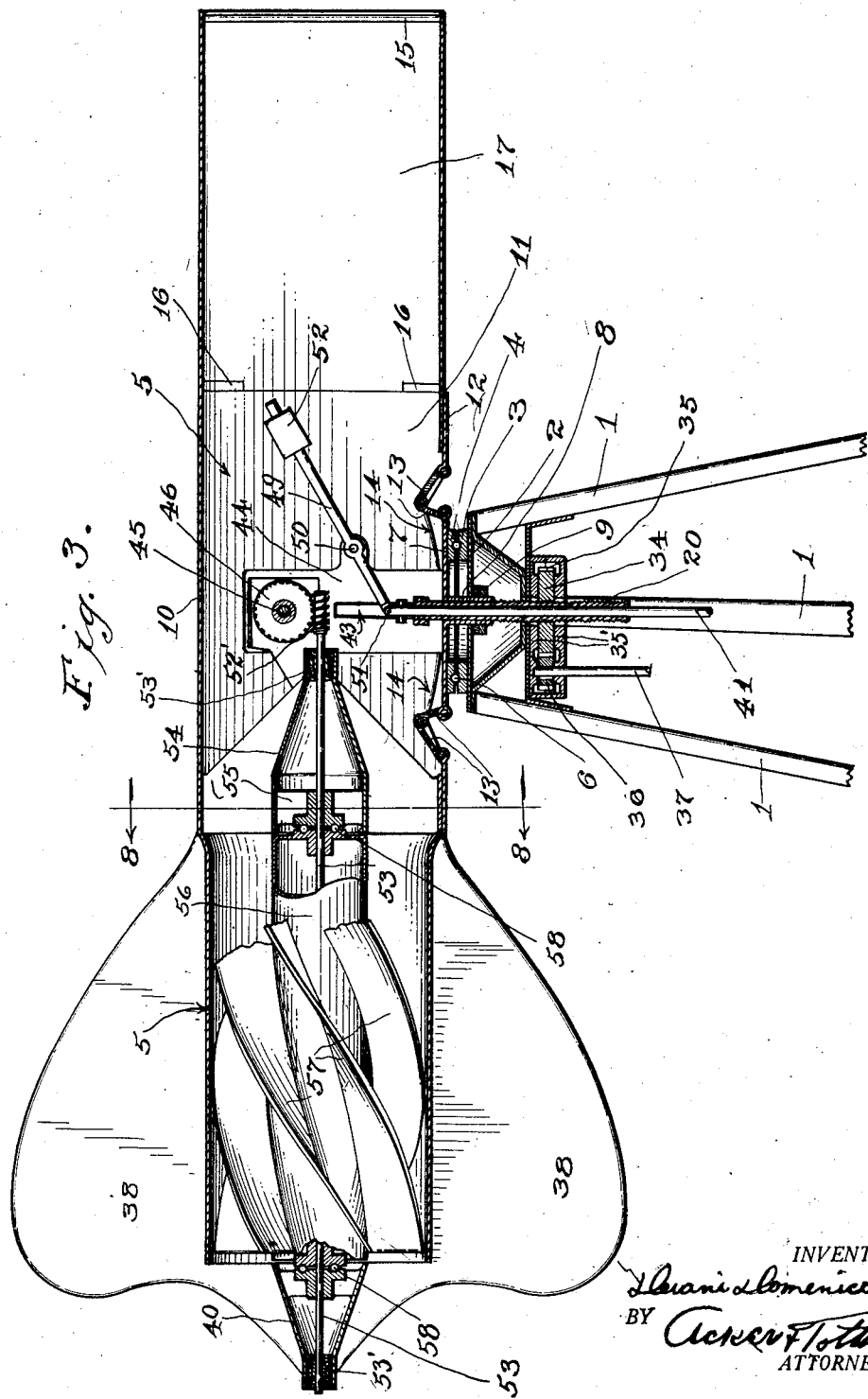
INVENTOR.

D. DOMENICO.
WINDMILL.
APPLICATION FILED NOV. 20, 1919.

1,361,696.

Patented Dec. 7, 1920.
5 SHEETS—SHEET 4.

INVENTOR.
Diana Domenico
BY
ATTORNEYS.

D. DOMENICO.
WINDMILL.
APPLICATION FILED NOV. 20, 1919.

1,361,696.

Patented Dec. 7, 1920.
5 SHEETS—SHEET 5.

INVENTOR.
Diana Domenico
BY
ATTORNEYS.

UNITED STATES PATENT OFFICE.

DEIANA DOMENICO, OF SAN FRANCISCO, CALIFORNIA.

WINDMILL.

1,361,696.

Specification of Letters Patent.

Patented Dec. 7, 1920.

Application filed November 20, 1919. Serial No. 339,338.

*To all whom it may concern:*

Be it known that I, DEIANA DOMENICO, a subject of the King of Italy, residing at the city and county of San Francisco and State of California, have invented certain new and useful Improvements in Windmills, of which the following is a specification.

The present invention relates to improvements in wind-mills whereby greater efficiency may be obtained than by the use of wind-mills now universally employed. The invention has for its particular objects to provide a construction having a wind tunnel mounting a wind wheel inclosed therein, enabling the full force and effect of the wind passing through the tunnel to exert its maximum power on the wind wheel; to provide a construction whereby the wind admitted into the mouth of the tunnel may be readily controlled; to provide a construction wherein the wind tunnel with its associated parts is capable of pivotal movement on a horizontal and a vertical axis to position the mouth of the tunnel relative to the wind, so that the maximum amount will pass through the tunnel. To provide a construction wherein the parts are so related that the power of the wind wheel is only required to lift the actual weight of the fluid pumped. A further object is to provide a construction wherein the wind wheel is of the elongated or cylinder type having blades radiating therefrom and disposed spirally around the same, this construction enabling the variation in the length of the wind wheel or the variation of the diameter thereof to control the power produced thereby under a given wind pressure.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 3 is a longitudinal sectional view taken on line 3—3 of Fig. 2, viewed in the direction of the arrows.

Figure 1:
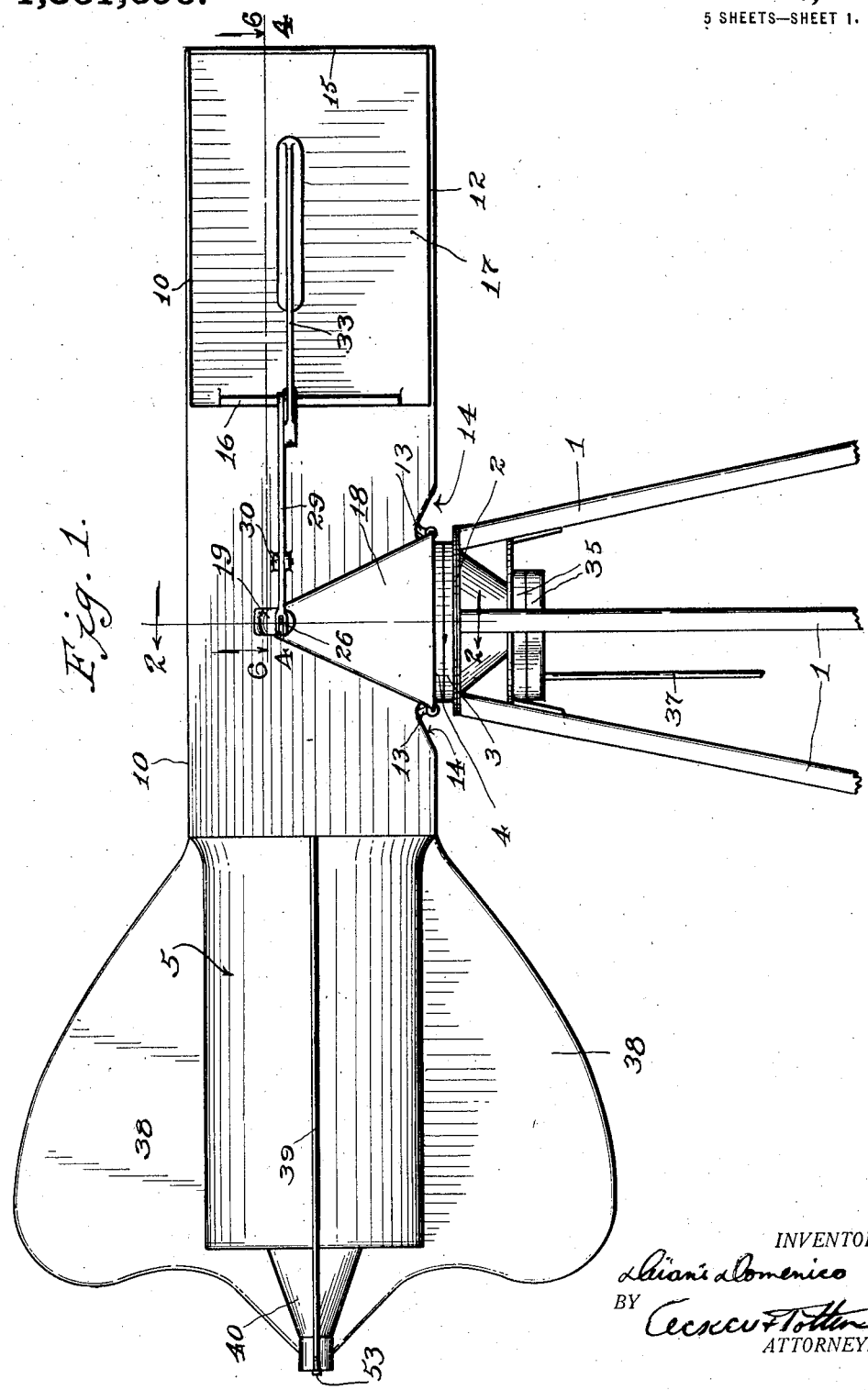
Figure 1 is a view in side elevation of the preferred embodiment of my invention.

Referring more particularly to the drawings, wherein like characters of reference designate corresponding parts—1 indicates a suitable supporting frame or other structure, carrying at its upper end a base or table 2 supporting a bearing ring 3 on which rests a corresponding bearing ring 4 which is secured in any suitable manner to the underside of the bottom wall of a suitable tubular open ended wind tunnel 5. Between the rings 3 and 4 are interposed anti-friction bearings 6, and depending downwardly from the plate 7, forming the central portion of the bottom wall of the tunnel 5, is a suitable tubular member 8 passing through a suitable opening in the table 2 and carrying on its lower ends the retaining nuts 9 threaded thereon and which hold the tunnel and its associated parts to the supporting member 1, the sleeve 8 providing a point of fulcrum which permits the free revolving of the tunnel on a vertical axis relative to the support 1.

The tunnel 5 at its front and central portions is substantially rectangular in cross section and at its rear is preferably circular in formation, and at its central portion consists of the top wall 10, opposite side walls 11 and bottom wall 12, which bottom wall is cut away at its center and is connected at the front and rear edges of the opening through the hinged plates 13 with the respective front and rear edges of the plate 7, this being particularly illustrated in Fig. 3. The base or lower portion of the side walls 11, adjacent the cutout portion of the bottom wall 12, are cut upwardly as at 14—Figs. 1 and 3 of the drawings.

Figure 4:
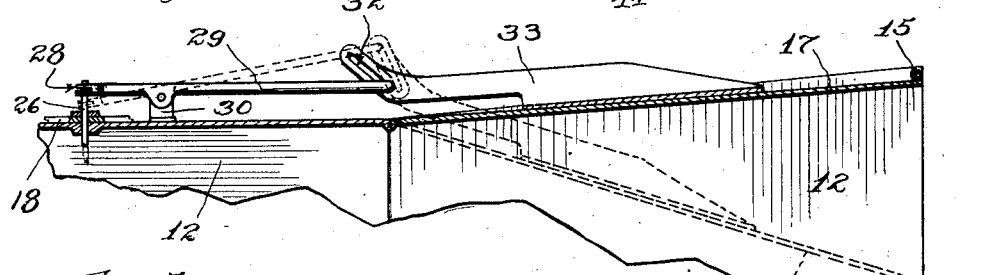
Fig. 4 is a fragmentary detail sectional view of one of the closure plates at the mouth of the tunnel and illustrated in dotted lines as in closed position.
Figure 5:
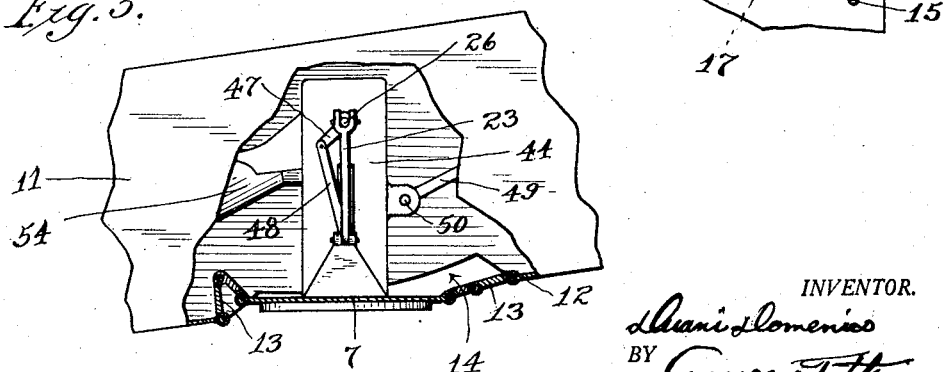
Fig. 5 is a fragmentary view illustrating the wall of the tunnel at its transverse center and with its side wall broken away, showing in detail one of the tunnel closure plate operating members and one of the pump rod cranks.
Figure 6:
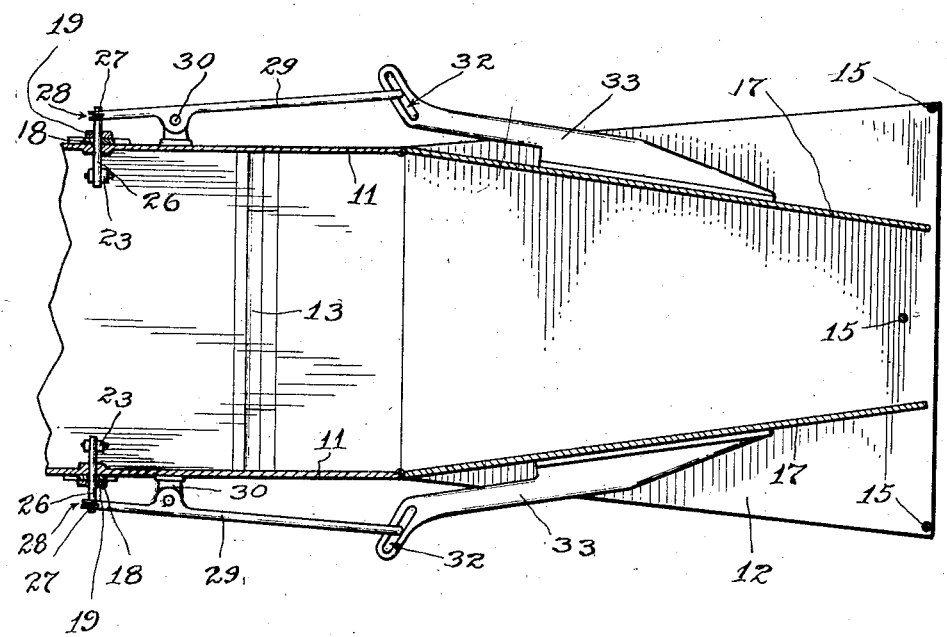
Fig. 6 is a sectional view taken on line 6—6 of Fig. 1, viewed in the direction of the arrows.
Figure 7:
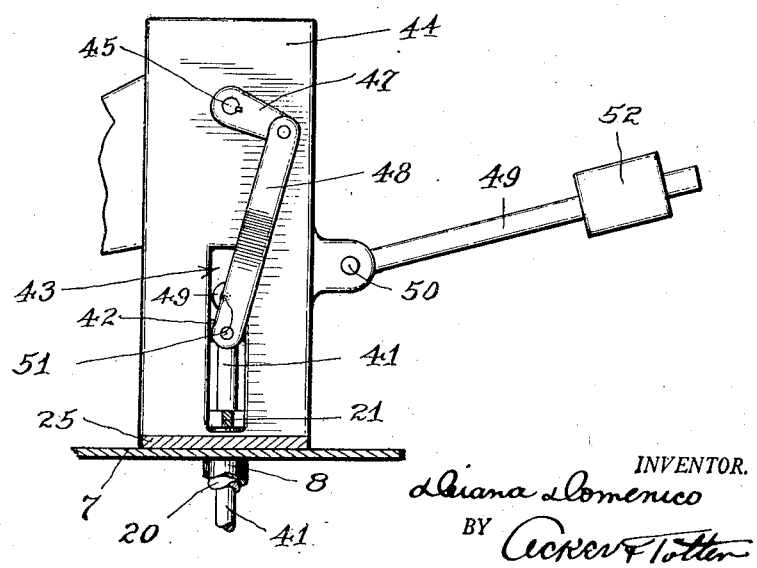
Fig. 7 is a fragmentary detail view taken on line 7—7 of Fig. 2, illustrating more fully the pump rod counter-balance weight and the connection between the driven pinion of the pump rod.
Figure 8:
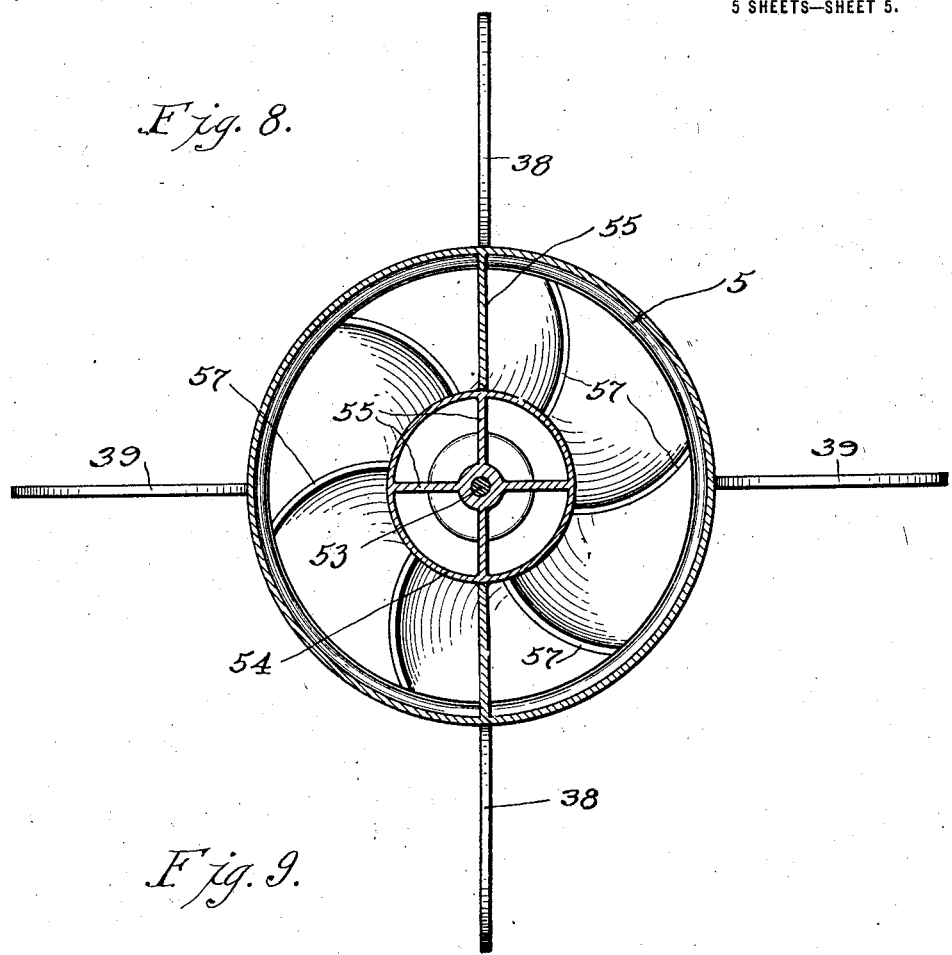
Fig. 8 is a vertical detail sectional view taken on line 8—8 of Fig. 3, viewed in the direction of the arrows.

At the forward end of the tunnel, the top wall 10 and bottom wall 12 are preferably solid extensions from the central portion of the tunnel and are united at their extreme outer end by the spacing or bracing bars or members 15 which are vertically disposed at the mouth of the tunnel, as illustrated in Figs. 3, 4 and 6 of the drawings. The side walls 11 terminate at the front end of the central compartment, and to their forward extremities are hinged, as at 16, to swing on a vertical pivot, the tunnel closure plates 17 which are of a length corresponding to the projecting portion of the top and bottom walls 10 and 12, and said plates are adapted to be swung, by hereinafter described mechanism, simultaneously to and from the full and dotted line position, Fig. 4.

The hinge sections 13 permit the tilting of the wind tunnel on a horizontal axis relative to the support 1, and to provide a fulcrum for said tunnel I have illustrated the sides of the plate 7 as being provided with upwardly extending arms 18 of a length to position the ends thereof slightly above the longitudinal center of the tunnel side walls, and the upper ends of said arms are rounded and are received in suitable pockets formed by the ears 19 secured to the side walls 11 of the central compartment of the wind tunnel at a point slightly above the longitudinal center of and at a point within the center of the length of said walls 11. Thus said tunnel is capable of tilting movement on a horizontal fulcrum relative to the plate 7, and is capable of a revolving movement on the support 1.

To open and close the plates 17 to control the volume of wind passing into the tunnel, any suitable form of mechanism may be employed, but the following is illustrated as being the preferred.

Extending upwardly through the tube 8 is a tube 20 which projects a slight distance above the upper surface of the plate 7 and carries the laterally extending arms 21 which are pivotally connected at their extremities through the links 22 with the short legs 23 of suitable bell cranks pivoted as at 24 to the upper ends of supporting brackets 25 carried on the upper surface of the plate 7. The upper ends of the bell cranks carry the laterally disposed rods 26 pivotally connected thereto and which rods extend through and are adapted to reciprocate in suitable alined openings in the upper ends of the members 18 in the side wall 11 of the central tunnel compartment and in the ears 19, this being particularly illustrated in Figs. 2, 4 and 6 of the drawings. The outer ends of the rods 26 are provided with laterally extending pins 27, which project into and operate within suitable slots 28 in the bifurcated ends of the levers 29 fulcrumed to the side walls 11 of the central tunnel compartment, as at 30, and said levers at their forward free ends being bent or curved downwardly and operating in the inclined slots 32 formed in the free rear ends of the arms 33 carried by the plates 17.

In order to operate the plates 17 it is necessary to vertically move the tube 20 within the tube 8 and to accomplish this result I prefer to use the following mechanism:—

Carried by the support 1 is a suitable nut 34 having peripheral gear teeth 35, the nut being threaded to the lower threaded end of the tube 20 and being held from vertical movement by the plates 35' positioned one above and the other below said nut, however, the nut is capable of rotation between said plates. To revolve the nut I provide a pinion 36 rotatably mounted between the plates 35' and from which extends an operating stem 37—Figs. 1 and 3 of the drawing.

By this construction it will be apparent that the wind tunnel is capable of free revolution on the support 1 without the action of the nut 34 on the tube 20 materially affecting the set position of the plates 17 at the mouth of the tunnel.

In order to maintain the mouth of the tunnel in the wind, I provide the vertical fins 38 radiating from the rear cylindrical portion of the tunnel—Figs. 1 and 3 of the drawings, these fins controlling the rotation of the tunnel on the support 1, and the horizontally disposed fins 39 extending laterally from the cylindrical rear end of the tunnel tend to operate the tunnel on its horizontal pivot. The rear ends of said fins 38 and 39 project rearwardly beyond the rear end of the tunnel and they support at the rear end of the tunnel a suitable bearing casing 40 which is disposed in line with the longitudinal center of the tunnel.

The pumping mechanism associated with the tunnel and connected with the fluid lift is preferably constructed and operates in the following manner:—

Figure 2:
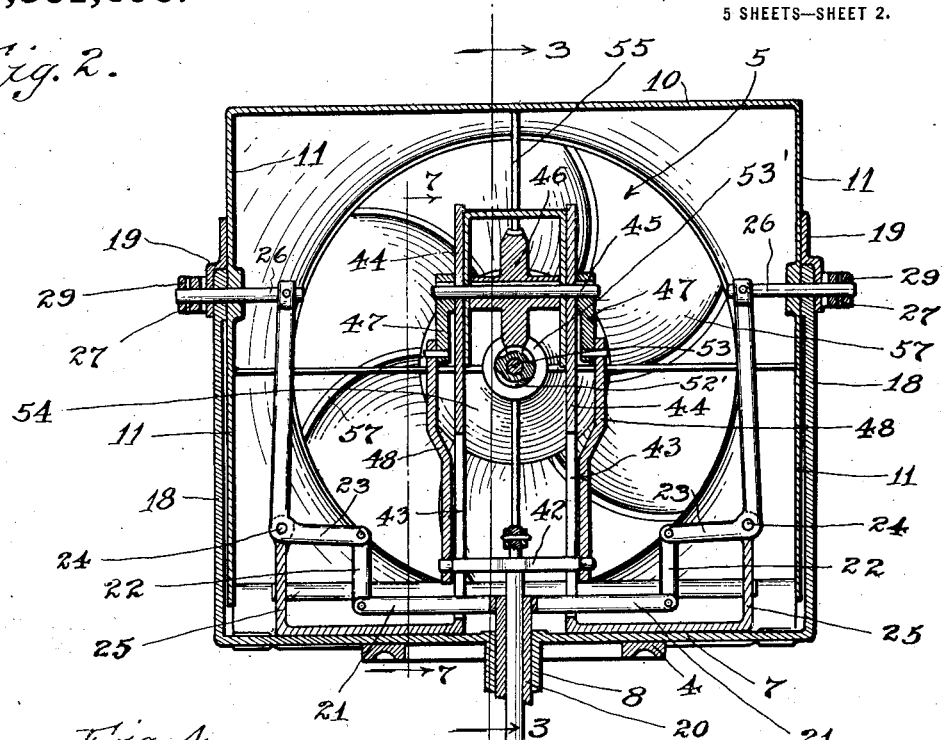
Fig. 2 is a vertical central sectional view taken on line 2—2 of Fig. 1.

Extending upwardly through the tube 20 is a pump rod 41, the upper end of which carries a cross head 42, Fig. 2 of the drawings, which extends at its opposite ends through vertical slots 43 in the vertically disposed parallel spaced portions 44 of the brackets 25.

Rotatably mounted adjacent the upper ends of the portions 44 is a transversely disposed shaft 45 carrying a worm gear 46 keyed thereto, and to the outer ends of said shaft 45 are secured the cranks 47 connected through links 48 with the opposite ends of the cross head 42. To counter-balance the weight of the rod 41 and its associated parts, I provide the lever 49 pivoted as at 50 to the extensions 44, and also pivoted as at 51 to the upper end of the rod 41, said lever carrying on its outer end the adjustable counterweight 52.

Figure 9:
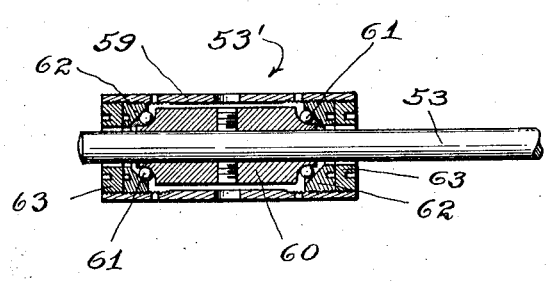
Fig. 9 is a longitudinal sectional view of one of the supporting bearings for mounting the wind wheel cylinder.

For imparting a reciprocating movement through the gear 46, links 48, cross-head 42 to the pump rod 41, I prefer to employ the following mechanism: Engaging with and positioned below the beveled gear 46 is a spiral gear 52' carried on the forward end of a rotatable shaft 53 extending rearwardly through the cylindrical portion of the wind-tunnel, said shaft being supported at its terminal ends in anti-friction bearings 53' illustrated in detail in Fig. 9 of the drawings, the rear bearing being carried in the casing 40, and the forward bearing being carried in the forward end of a conical casing 54 positioned in the rear of the central tunnel compartment. The casing 54 is longitudinally disposed centrally of the rear of said central compartment and is supported by the directing fins or blades 55 radiating from the wall thereof and at their outer ends secured in any suitable manner to the interior surface of the walls of said central compartment, the rear end of said casing 54 and said fins or blades 55 terminating at the forward end of the rear cylindrical compartment of the wind tunnel, as illustrated in Fig. 3 of the drawings. Secured to the shaft 53 interior the forward end of the casing 40 at the rear end of the casing 54 is the cylinder 56, from the periphery of which radiate the spirally disposed longitudinally extending fins or blades 57, which are acted on by the wind passing through the tunnel to impart a rotative movement to the cylinder 56 and rotate the shaft 53.

While I have illustrated the cylinder 56 and blades 57 of a length approximately one-third of the over-all length of the wind tunnel, it is to be understood that the power derived therefrom may be correspondingly varied for any given wind pressure, by increasing or decreasing the length of said blades and cylinder, and also may be varied by reducing the diameter of the cylinder and increasing the height or width of the blades or fins.

Suitable thrust bearings 58 may be positioned at opposite ends of the cylinder 56 to insure the free rotation of the cylinder. The bearings 53' are preferably constructed of an outer cylinder 59, within which rotates the inner cylinder 60 to which the shaft 53 is secured, the bearing members or balls 61 which are positioned between the ends of the inner cylinder and suitable adjusting nuts 62 threaded into the opposite ends of the outer cylinder 59, provide anti-friction means for said inner cylinder; the adjusting nuts 62 being held in their adjusted position within opposite ends of the outer cylinder by suitable lock nuts 63.

While I have illustrated the preferred form of anti-friction bearing to be used, it is to be understood that I am not to be limited to this specific form of anti-friction bearing, but may employ in my device any suitable form of anti-friction bearing I may desire to use.

In the operation of the device, it will be apparent that by providing the counterweighted lever 49 connected with the pump rod 41 the power required on the up-stroke of the pump rod 41 and to be delivered by the wind wheel over that required on the down-stroke of the pump rod need only be sufficient to lift the fluid volume pumped.

Having thus described my invention what I claim is:

1. A wind-mill including a support, an open-ended wind tunnel rotatably mounted thereon on a vertical axis, a wind-wheel within the tunnel, and means at the rear end of the tunnel for maintaining the forward end thereof in the wind, a pair of closure plates or gates hinged at the forward end of the tunnel whereby the area of the receiving end of the tunnel may be varied, and means extended through the axis of rotation of the tunnel and connected with the closure plates for operating said plates.

2. A wind-mill including a base, an elongated tubular wind tunnel supported thereon and capable of pivotal movement thereon on a vertical axis, an elongated wind-wheel within the rear end of said tunnel, a pump rod associated with said support extending through said tunnel centrally of the axis of rotation thereof, a drive connection between the wind-wheel and pump rod, same consisting of an auxiliary frame positioned within the tunnel, a gear carried thereby, crank arms associated with the shaft of said gear, links connecting the crank arms with said pump rod, and a worm gear carried by and rotatable with said wind wheel, means for maintaining the forward end of said wind tunnel in the wind, and means carried by said frame and connected with said tunnel to permit the same to pivot on a horizontal axis in line with the axis of rotation of said gear.

3. A wind-mill including a support, an elongated tubular open-ended wind tunnel supported thereby and capable of pivotal movement thereon on a vertical axis, an elongated wind-wheel rotatably mounted in one end of said wind tunnel, a pump rod associated with said support and extending into said tunnel centrally of the axis of rotation thereof, a connection between the wind-wheel and pump rod, means for maintaining one end of said wind tunnel in the wind, means for varying the area of the wind tunnel exposed to the wind and devices for operating said means extended from said tunnel and surrounding said pump rod.

4. A wind-mill including a base, an elongated tubular open ended wind tunnel mounted centrally of its length thereon and capable of pivotal movement on a horizontal and vertical axis, an elongated wind-wheel rotatably mounted in one end thereof, said wind-wheel comprising an elongated cylinder, and a plurality of blades radiating therefrom and extending spirally about the same, a shaft associated with said wind-wheel, a pump rod associated with a support, a link connection between the shaft and pump rod, and means associated with the end of said wind tunnel carrying said wind wheel for maintaining the other end of said tunnel in the wind.

5. A wind-wheel including a supporting base, a tubular elongated open-ended wind tunnel mounted thereon, said tunnel at its center provided with a portion secured to said support, a hinge connection between the edges of said portion and said tunnel, a plate associated with said support and on which said portion rests, a tubular member extended from said portion and through said plate, a pair of plates at one end of said tunnel capable of movement for varying the opening of said tunnel, a threaded tubular sleeve positioned within said member and connected with said plates, means for raising and lowering said sleeve to operate said plates, a pump rod extending through said sleeve, a wind-wheel within said wind tunnel, a drive connection between said wind-wheel and pump rod and a plurality of vanes for maintaining the controllable end of said tunnel pointed toward the wind.

6. A wind-wheel including a supporting base, a tubular elongated open-ended wind tunnel mounted thereon, said tunnel at its center provided with a portion secured to said support, a hinge connection between the edges of said portion and said tunnel whereby pivotal movement on a horizontal axis between said tunnel and support is provided, a vertical pivot through said member whereby said tunnel is capable of swinging movement relative to said base, a wind-wheel within the tunnel, a pump rod extended through said vertical fulcrum point, and a connection between the pump rod and wind-wheel whereby reciprocating movement is imparted to the pump rod on the operation of the wind wheel.

7. A wind-wheel including a support, an open-ended wind tunnel mounted thereon to swing on a vertical axis, an elongated wind-wheel within said tunnel, a pump rod extended through said support and into said tunnel through the axis of rotation of said tunnel, a driving connection between said wind-wheel and pump rod whereby the rotation of said wind-wheel imparts reciprocating movement to said pump rod without interfering with the swinging of said tunnel on said support and means disposed at right angles to the axis of vertical swinging movement of the tunnel for permitting the raising and lowering of the forward end of said wind tunnel.

8. A wind-mill including a support, an open ended wind tunnel mounted approximately centrally of its length thereon to swing on a vertical axis, a gate pivotally mounted adjacent to one end of the tunnel for varying the area of the tunnel exposed to the wind, means for maintaining the forward end of the tunnel toward the wind, a horizontally disposed elongated wind-wheel rotatably mounted within said tunnel, a pump rod extended through the axis of rotation of the tunnel, a connection between the wind wheel and pump rod whereby reciprocating movement is imparted to the pump rod on the rotation of said wind wheel, an arm extended from said gate and formed with a radial slot in its end, and operating means coöperating with said arm and consisting of interconnected links and levers, a sleeve connected with said operating means and surrounding the pump rod to extend through the axis of rotation of said wind tunnel whereby said gate may be operated without interfering with the swinging of said wind tunnel and gear mechanism for adjusting said sleeve and for maintaining said gate in its said position.

9. A wind-mill including a support, an open-ended wind tunnel rotatably mounted thereon to swing on a vertical axis, a wind-wheel within the tunnel, a pump rod extended into the tunnel, means at the rear end of the tunnel for maintaining the forward end thereof in the wind, a shaft rotatable by the wind wheel and carrying a worm gear, a worm pinion driven by said worm gear, a pair of crank arms rotatable with said gear, a cross head on the pump rod, a link connecting each end of the cross head with one of said arms and a counterbalanced lever connected with said pump rod.

10. A wind mill including a support, a tubular open ended wind tunnel mounted thereon, means for maintaining one end of the tunnel to the wind, a plurality of supports within the tunnel and intersecting each other, a conical cylinder carried thereby at the axis of their intersection, a wind wheel cylinder in rear of said conical cylinder and disposed longitudinally of the rear end of the tunnel, said cylinders reducing the inner area of the tunnel at its rear end, a plurality of vanes extended spirally from the periphery of the wind wheel cylinder, a shaft for supporting said wind wheel cylinder and rotatable in said conical cylinder with said wind wheel cylinder, a reciprocating pump rod, and a connection for imparting reciprocating movement to the pump rod on the rotation of said shaft.

In testimony whereof I have signed my name to this specification in the presence of two subscribing witnesses.

DEIANA DOMENICO.

Witnesses:
HARRY H. TOTTEN,
D. B. RICHARDS.